(12) United States Patent
Holzschuh

(10) Patent No.: US 6,435,201 B2
(45) Date of Patent: Aug. 20, 2002

(54) NON-RETURN VALVE

(75) Inventor: Johann Holzschuh, Meinerzhagen (DE)

(73) Assignee: Battenfeld GmbH, Meinerzhagen (DE)

( * ) Notice: Subject to any disclaimer, the term of this patent is extended or adjusted under 35 U.S.C. 154(b) by 0 days.

(21) Appl. No.: 09/730,467

(22) Filed: Dec. 5, 2000

(30) Foreign Application Priority Data

Dec. 10, 1999 (DE) .......................... 199 59 495

(51) Int. Cl.$^7$ .......................... F16K 15/06; B29C 45/52
(52) U.S. Cl. .................. 137/1; 137/533.27; 264/328.1; 425/563; 425/DIG. 224
(58) Field of Search .................... 137/1, 15.18, 528, 137/533.27; 264/328.1; 425/146, 562, 563, DIG. 224; 366/78

(56) References Cited

U.S. PATENT DOCUMENTS

| | | | |
|---|---|---|---|
| 5,164,207 A | | 11/1992 | Durina .................. 425/382.4 |
| 5,167,971 A | * | 12/1992 | Gill et al. .................. 425/559 |
| 5,240,398 A | * | 8/1993 | Akaguma et al. ........... 425/146 |
| 5,401,161 A | * | 3/1995 | Long .......................... 425/563 |
| 5,439,633 A | * | 8/1995 | Durina et al. ........... 264/328.17 |
| 5,498,151 A | * | 3/1996 | Nennecker .................. 425/130 |
| 5,849,236 A | * | 12/1998 | Tatham .................... 264/297.2 |
| 5,891,381 A | * | 4/1999 | Bemis et al. ............. 264/328.8 |
| 6,007,322 A | * | 12/1999 | Suumen et al. ............. 425/557 |
| 6,203,311 B1 | * | 3/2001 | Dray .......................... 425/562 |

FOREIGN PATENT DOCUMENTS

| | | |
|---|---|---|
| DE | 198 36 871 A1 | 7/1999 |
| JP | 01-242222 | 9/1989 |
| WO | WO 97/19800 | 6/1997 |

* cited by examiner

Primary Examiner—Michael Powell Buiz
Assistant Examiner—Ramesh Krishnamurthy
(74) Attorney, Agent, or Firm—Hamilton, Brook, Smith & Reynolds, P.C.

(57) ABSTRACT

The invention relates to a non-return valve, which is situated at the end of a plasticizing and injection screw to control the flow of plastic melt from the region of the screw channels of the plasticizing and injection screw to the region of the space in front of the screw of a preplasticizing cylinder, where the plasticizing and injection screw is situated, the non-return valve having a basic body, which is rigidly connected to the plasticizing and injection screw, and an outside part, which can move translationally and preferably also rotationally relative to the basic body, so as to allow the flow of plastic melt in a first position and block the flow of plastic melt in a second position. To improve the locking behavior of the non-return valve and to simplify its structure, the outside part has at least two melt lines, which are not connected to one another, and the basic body has at least one melt line, such that the melt lines, of which there are at least two, of the outside body, together with the melt line of the basic body, in the first position jointly form a fluidic connection between the region of the screw channels and the region of the space before the screw, and such that the fluidic connection between the region of the screw channels and the region of the space before the screw is interrupted in the second position by a region of the basic body.

15 Claims, 1 Drawing Sheet

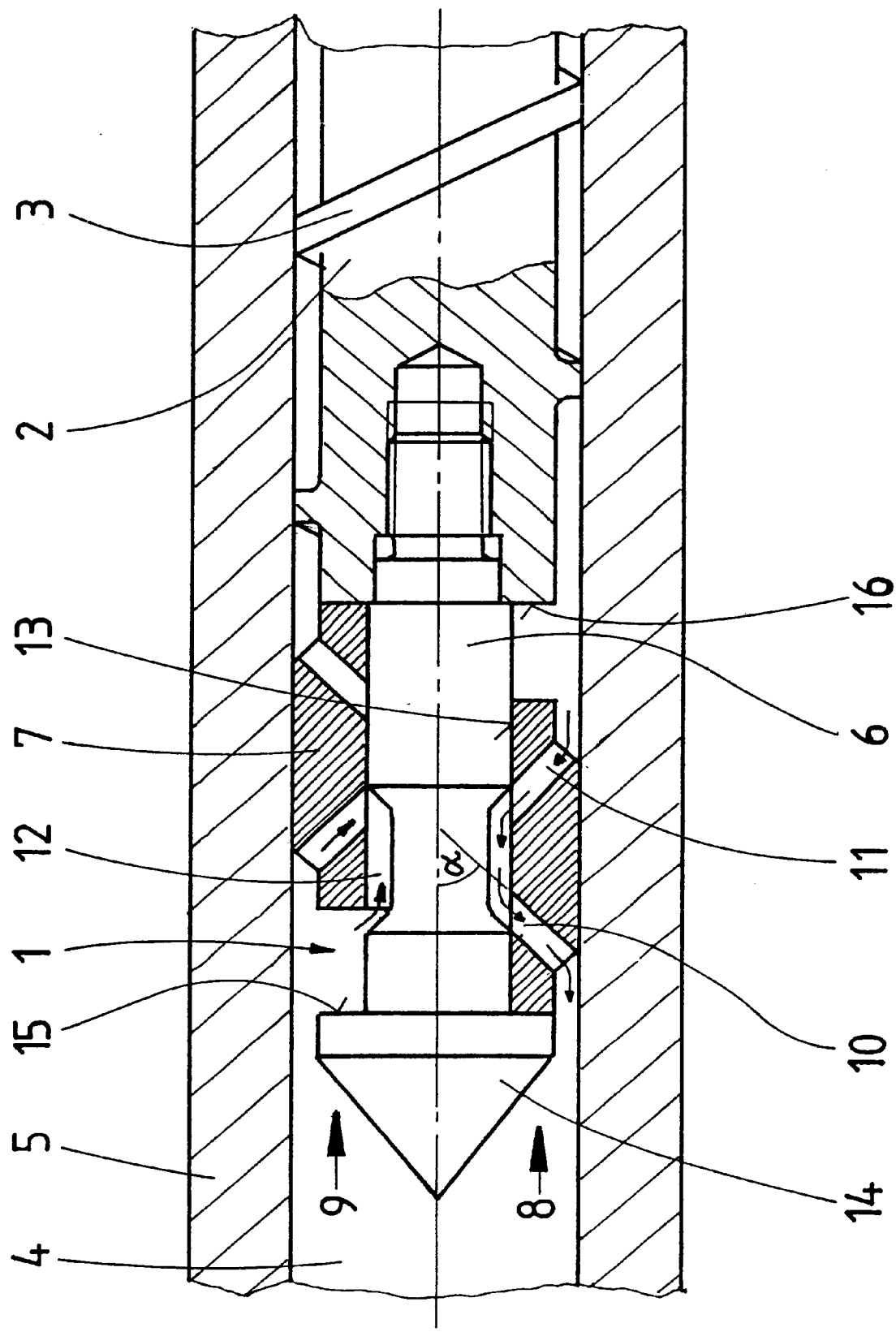

NON-RETURN VALVE

RELATED APPLICATION

This application claims the benefit of German Application 199 59 495.3, filed Dec. 10, 1999, the teachings of which are incorporated herein by reference.

BACKGROUND OF THE INVENTION

Non-return valves are typically used in the field of injection molding when a plasticizing and injection screw rotates, to allow plastic melt, as it is transported from a material funnel by the screw with its screw channels, to reach the space before the screw, and, when the melt is injected into an injection molding tool, by translational motion of the screw, to prevent the melt from flowing back.

A plurality of non-return valves for injection molding machines are known. In terms of one of their characteristics, these can be divided into two structural forms; this characteristic relates to the design of the outer part of the non-return valve, which comes in contact with the inside wall of the preplasticizing cylinder:

The first group of non-return valves has an outside part which does not have a positive connection to the basic body of the non-return valve, and which is not constrained to rotate together with it.

The second group of non-return valves has an outside part which is constrained to rotate together with the basic body of the non-return valve.

Non-return valves belonging to the first group have the advantage that, when the screw rotates, no relative motion occurs between the cylindrical casing surface of the outside wall and the inside wall of the preplasticizing cylinder. However, they have the disadvantage that a high surface pressure appears on the mutually contacting axial surfaces, between the rotating part (basic body of the valve) and the non-rotating part (outside part), which can cause destruction of the non-return valve.

Non-return valves of the second group have the disadvantage that, when the screw rotates, relative motion occurs between the cylindrical casing surface of the outside part and the inside wall of the preplasticizing cylinder, thereby causing wear which attacks both the non-return valve and the inside wall of the preplasticizing cylinder. On the other hand, this design has the advantage that the axial surfaces are not attacked by wear, because the outside part does not move relative to the basic body of the non-return valve.

Both design forms have the common feature that the melt is prevented from flowing back by an axial motion of the components-namely the outside part relative to the basic body of the non-return valve-through the axial force acting on it through overpressure while the injection motion is beginning and, due to the axially disposed sealing surfaces, the melt flows back completely only if the sealing surfaces touch with simultaneous action of a high pressure force.

SUMMARY OF THE INVENTION

In light of these previously known designs of non-return valves, a non-return valve is provided which makes do with a minimum number of parts and which combines the respective advantageous properties of the above-cited two groups of non-return valves. At the same time, the respective known disadvantages of the two groups are avoided as much as possible. Finally, it is possible to close the lock securely but gently without great axial forces.

In accordance with aspects of the present invention, a non-return valve includes an outside part having at least two melt lines, which are not connected to one another, and the basic body has at least one melt line, such that the melt lines, of which there are at least two, of the outside body, together with the melt line of the basic body, in the first position jointly form a fluidic connection between the region of the screw channels and the region of the space before the screw, and such that the fluidic connection between the region of the screw channels and the region of the space before the screw is interrupted in the second position by a region of the basic body.

It is also within the scope of the invention that the outside part of the non-return valve together with the basic body of the lock can form a flow path for the melt-if the outside part and the basic body have an appropriate relative position, but that this flow path can be blocked if these two parts are moved relative to one another.

A further development specifies that the melt lines in the outside part are formed by bores. Several of these bores can be situated over the circumference of the outside part. The bores preferably are arranged equidistant over the circumference of the outside part. Furthermore, for rheological reasons it can be preferred that the angle ($\alpha$) between the axis of the bores and the rotation axis of the plasticizing and injection screw is between 30° and 90°, preferably 45°.

The melt line of the basic body can be formed as a depression in the circumferential surface of the basic body.

The non-return valve of the present invention also cannot dispense with relative motions between the components. Consequently, it is proposed that the outside circumference of the outside part has a wear-resistant layer, in particular that it should be coated therewith. The like holds for the inside circumference of the outside part. Furthermore, the contact surfaces of the basic part, which the outside part can touch, have a wear-resistant layer, and in particular are coated therewith.

In one embodiment, the basic body has a tip, the basic body and the tip being formed integrally with one another. Furthermore, the basic body can be screwed rigidly to the plasticizing and injection screw. Finally, the outside part can have essentially the shape of a hollow cylinder.

The inventive design achieves various advantages such as the non-return valve can make do with a minimum number of parts. The lock can be produced correspondingly economically. Further, the contacting parts slide against one another with minimal speeds, as a result of which the non-return valve is correspondingly free of wear. The outside part of the non-return valve acts as a mixing part, which improves the homogeneity of the plastic melt. Furthermore, the non-return valve closes gently and firmly.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

The drawing schematically shows a section through a preplasticizing cylinder together with a plasticizing and injection screw and a non-return valve.

DESCRIPTION OF THE INVENTION

A description of preferred embodiments of the invention follows. The FIGURE shows a preplasticizing cylinder 5, within which is situated a plasticizing and injection screw 2, so that it can both rotate and move translationally. When the screw rotates, the plastic material (not shown) is plasticized and homogenized through the screw channels 3, and is transported "to the left" into the region of the space 4 before the screw.

A non-return valve 1 is screwed onto the end of the screw 2 and includes a tip 14 and a basic body 6. The tip 14 and the basic body 6 can be formed integrally, and in one embodiment, are affixed to the screw 2 by a screw connection.

To control the flow of melt, an outside part 7 is situated on the basic body 6 of the lock 1. While the basic body 6 has a cylindrical shape over its significant region, the outside part 7, shaped as a hollow cylinder, surrounds the basic body 6.

A first position 8 of the outside part 7 relative to the basic body 6 is sketched in the lower half of the figure. In this position, the non-return valve is open, and the melt therefore can be transported "to the left." The upper half of the figure, on the other hand, shows a second position 9, in which the outside part 7 is arranged relative to the basic body 6 such that the lock is closed, that is melt cannot flow from the "right" to the "left" into the space 4 before the screw or vice versa. In the second position 9, therefore, melt can be injected from the space 4 before the screw into the injection molding tool (not shown) by a translational motion of the screw 2.

Two groups of melt lines 10 and 11 are inserted into the outside part 7. These lines are designed as bores, which are respectively arranged at a definite angle α. This angle can range between 30° and 90°, but preferably is about 45°.

Likewise, the melt line 12, in the form of a depression, is milled into the outside circumference of the cylindrical part of the basic body 6. This depression is preferably designed as a rotationally symmetric, circumferential, turned groove.

As the lower half of the figure shows, in the open position 8 of the non-return valve 1, the outside part 7 contacts the axial stop 15 at the tip 14. The melt lines 10, 11, and 12 here are positioned in such a way that a fluid connection exists between the region of the screw channels 3 and the space 4 before the screw; in the figure, this is indicated by the arrows in the lower half of the figure.

In the open position, the outside part 7, which is not constrained to rotate in synchronism, presses on the axial stop 15, with a relative speed which is much less than the speed prevailing at the outer circumference of the screw.

On the other hand, if the outside part 7 is moved against the right axial stop 16, by translational motion of the screw 2, the fluidic connection is interrupted; the non-return valve is closed. The backflow of melt from the region of the space 4 before the screw back into the region of the screw channels 3 is here already stopped during the axial motion of the outside part. The transition from the opened position into the locking position occurs gradually along the cylindrical contact surfaces of the basic body 6 and the outside part 7, which act as sealing surfaces; this effect is independent of the axial force acting on the outside part 7. Thus, the fluidic connection between the region of the screw channels 3 and the region of space 4 before the screw is interrupted in the second position by a region 13 of the basic body.

While this invention has been particularly shown and described with references to preferred embodiments thereof, it will be understood by those skilled in the art that various changes in form and details may be made therein without departing from the scope of the invention encompassed by the appended claims.

What is claimed is:

1. A non-return valve, which is situated at the end of a plasticizing and injection screw to control the flow of plastic melt from the region of screw channels of the plasticizing and injection screw to a region of space in front of the screw of a preplasticizing cylinder, where the plasticizing and injection screw is situated,
    the non-return valve having a basic body, which is rigidly connected to the plasticizing and injection screw; and
    an outside part, which can move translationally and rotationally relative to the basic body, so as to allow the flow of plastic melt in a first position and block the flow of plastic melt in a second position;
    the outside part having at least two melt lines, which are not connected to one another, and the basic body having at least one melt line, such that the melt lines, of which there are at least two, of the outside part, together with the melt line of the basic body, in the first position jointly form a fluidic connection between the region of the screw channels and the region of the space before the screw; and such that the fluidic connection between the region of the screw channels and the region of the space before the screw is interrupted in the second position by a region of the basic body.

2. The non-return valve of claim 1, wherein the melt lines are formed in the outside part by bores.

3. The non-return valve of claim 2, wherein several bores are always arranged over the circumference of the outside part.

4. The non-return valve of claim 3, wherein the bores are arranged equidistant over the circumference of the outside part.

5. The non-return valve of claim 2, wherein the angle (α) between an axis of the bores and a rotation axis of the plasticizing and injection screw has a value between about 30° and 900°.

6. The non-return value of claim 5, wherein the angle (α) has a value of about 45°.

7. The non-return valve of claim 1, wherein the melt line of the basic body is formed as a depression in the circumferential surface of the basic body.

8. The non-return valve of claim 1, wherein the outer circumference of the outside part has a wear-resistant layer coated therewith.

9. The non-return valve of claim 1, wherein the inside circumference of the outside part has a wear-resistant layer coated therewith.

10. The non-return valve of claim 1, wherein the contact surfaces of the basic body, which the outside part can contact, has a wear-resistant layer coated therewith.

11. The non-return valve of claim 1, wherein the basic body has a tip, the basic body and the tip being formed integral with one another.

12. The non-return valve of claim 11, wherein the basic body is rigidly screwed together with the plasticizing and injection screw.

13. The non-return valve of claim 1, wherein the outside part essentially has the form of a hollow cylinder.

14. A non-return valve for use in a preplasticizing cylinder comprising:
    a body section rigidly connected to a plasticizing and injection screw; and
    an outside part surrounding the body section which can move translationally relative to the body section to allow the flow of plastic melt from screw channels of the screw to a region in front of the screw in a first position and block the flow of plastic melt in a second position;
    the outside part having at least two non-connected melt lines, and the body section having at least one melt line such that the melt lines, of which there are at least two, of the outside part, together with the melt line of the basic body, in the first position jointly form a fluidic connection between the region of the screw channels and the region of the space before the screw, such that the fluidic connection between the region of the screw channels and the region of the space before the screw is interrupted in the second position by a region of the basic body.

15. A method for controlling the flow of plastic melt in a preplasticizing cylinder, comprising:
    providing a non-return valve at the end of a plasticizing and injection screw to control the flow of plastic melt from a region of screw channels of the plasticizing and injection screw to a region of space in front of the screw of the preplasticizing cylinder;
    rigidly connecting a basic body of the non-return valve to the plasticizing and injection screw, the basic body having at least one melt path; and
    providing an outside part, which can move translationally and rotationally relative to the basic body, so as to allow the flow of plastic melt in a first position and block the flow of plastic melt in a second position, the outside part having at least two melt paths that are not connected to one another;
    such that the melt paths, of which there are at least two, of the outside part, together with the melt path of the basic body, in the first position jointly form a fluidic connection between the region of the screw channels and the region of the space before the screw, and such that the fluidic connection between the region of the screw channels and the region of the space before the screw is interrupted in the second position by a region of the basic body.

* * * * *

UNITED STATES PATENT AND TRADEMARK OFFICE
CERTIFICATE OF CORRECTION

PATENT NO.   : 6,435,201 B2
DATED        : August 20, 2002
INVENTOR(S)  : Johann Holzschuh It is certified that error appears in the above-identified patent and that said Letters Patent is hereby corrected as shown below:

Column 4,
Line 42, delete "900º" and insert -- 90º --.

Signed and Sealed this

Fourth Day of February, 2003

JAMES E. ROGAN
*Director of the United States Patent and Trademark Office*